United States Patent
Skirmont et al.

(10) Patent No.: US 7,058,009 B1
(45) Date of Patent: Jun. 6, 2006

(54) ROUTER-LEVEL AUTOMATIC PROTECTION SWITCHING

(75) Inventors: David Skirmont, Redwood City, CA (US); Puneet Agarwal, San Francisco, CA (US)

(73) Assignee: Pluris, Inc., Cupertino, CA (US)

( * ) Notice: Subject to any disclaimer, the term of this patent is extended or adjusted under 35 U.S.C. 154(b) by 760 days.

(21) Appl. No.: 09/663,869

(22) Filed: Sep. 15, 2000

(51) Int. Cl.
*H04L 12/26* (2006.01)

(52) U.S. Cl. .............. 370/217; 370/221; 370/229; 370/242

(58) Field of Classification Search ......... 370/216, 370/217, 218, 221, 225, 229, 230, 230.1, 370/231, 235, 236, 241.1, 242, 244, 248, 370/249, 250

See application file for complete search history.

(56) References Cited

U.S. PATENT DOCUMENTS

| | | | |
|---|---|---|---|
| 4,991,204 A * | 2/1991 | Yamamoto et al. | 379/221.01 |
| 5,173,689 A * | 12/1992 | Kusano | 370/225 |
| 5,590,125 A * | 12/1996 | Acampora et al. | 370/397 |
| 5,682,479 A * | 10/1997 | Newhall et al. | 709/242 |
| 5,764,624 A * | 6/1998 | Endo et al. | 370/218 |
| 5,848,227 A | 12/1998 | Sheu | |
| 5,926,456 A * | 7/1999 | Takano et al. | 370/218 |
| 5,959,972 A | 9/1999 | Hamami | |
| 6,032,266 A | 2/2000 | Ichinohe et al. | |
| 6,072,806 A * | 6/2000 | Khouri et al. | 370/465 |
| 6,081,530 A * | 6/2000 | Wiher et al. | 370/395.53 |
| 6,278,714 B1 * | 8/2001 | Gupta | 370/422 |
| 6,570,881 B1 * | 5/2003 | Wils et al. | 370/410 |

FOREIGN PATENT DOCUMENTS

EP  0 653 866 A  5/1995

* cited by examiner

*Primary Examiner*—Steven Nguyen
*Assistant Examiner*—Roberta Shand
(74) *Attorney, Agent, or Firm*—Donald R. Boys; Central Coast Patent Agency, Inc.

(57) ABSTRACT

In a data packet router, a method for redirecting packets destined for a port comprises steps of monitoring port status on a continuing or periodic basis, updating a port-status table, listing port status as active or failed and an alternative destination for each port, checking the table by circuitry along a packet route for a packet en route, and sending the received packet to the predestined port if the port is listed in the table as active, and sending the received packet to the alternative destination if the port is listed in the table as failed. The method can be implemented essentially anywhere along a routing path where circuitry may support a table look-up and re-tagging packets for alternative destinations. In one embodiment the automatic protection switching is performed in a fabric card, and in another on a line card.

20 Claims, 6 Drawing Sheets

| Port | Status | Redirect |
|------|--------|----------|
| 0 | active | 9327 |
| 1 | failed | 9327 |
| 2 | failed | 4674 |
| 3 | active | 9218 |
| . | | |
| . | | |
| n | | |

*Fig. 6*

ROUTER-LEVEL AUTOMATIC PROTECTION SWITCHING

FIELD OF THE INVENTION

The present invention is in the area of data packet routers for use with wide-area networks, such as the Internet, and pertains more particularly to Automatic Protection Switching (APS) within such routers.

BACKGROUND OF THE INVENTION

At the time of the present patent application demand for increased data capacity and efficiency in Internet traffic continues to increase dramatically as more individuals and businesses increase their use of the Internet. The ever-increasing demand also drives development of equipment for the Internet such as data packet routers. A number of enterprises are developing routers that are capable of faster and higher capacity handling of data packets.

The Internet, operating globally, comprises components from a wide variety of companies and organizations. It is, of course, necessary that such equipment conform to certain hardware and connection standards and operate by certain data transfer standards and protocols. These standards are all well known to the skilled artisan.

As new and better equipment for routing data traffic in the Internet continues to be developed, researchers developing such equipment are including fault tolerance, diagnostic capabilities, and redundancy into the equipment, links between instances of routing equipment, and in routing protocols. At the time of the present patent application, for example, there exist redundancy systems for data traffic between routers, generally termed Automatic Protection Switching (APS) in the art. APS is described in more detail as it exists in the art below, under the section entitled "Description of the Preferred Embodiments".

One of the important developments in Internet technology as of the time of filing of the present patent application is in development of faster, and scalable routers. The present inventors, for example, are involved in development of what are known in the art as Terabit routers, capable of much higher packet transfer rates than currently available in the art.

It is highly desirable in new and faster routers to make very quick switchover to alternate routing paths if there should be a failure, impeding flow of data packets. The need for quick reaction is quite simply the fact that many packets (much data) is lost with slower switchover. It is therefore desirable to have a quick hardware temporary solution in the event of component failure, followed by a more complete software solution, and then eventual repair. It is to this need for quick reaction to partial failure in routers, that is, failure of individual paths and components, to which the present application is addressed. The inventors have developed apparatus and methods for addressing this need.

SUMMARY OF THE INVENTION

In a preferred embodiment of the present invention a method is provided for redirecting packets received in a line card in a data packet router, the packets received by fabric interface circuitry on the line card and destined for a port on the line card. A preferred embodiment comprises the steps of monitoring port status by a CPU on the line card, updating of information in the fabric interface circuitry by the CPU listing port status as active or failed and an alternative destination for each port, checking the table by the interface circuitry for a packet received, and sending the received packet to the predestined port if the port is listed in the table as active, and sending the received packet to the alternative destination if the port is listed in the table as failed. In another embodiment a method is provided wherein the fabric interface circuitry comprises one or more Global Fabric application-specific integrated circuits (GFRs).

In another embodiment a method is provided wherein the line card comprises four external ports and two GFRs. In another embodiment a method is provided wherein the operations of the interface circuitry in the steps of checking the table by the interface circuitry for a packet received, and sending the received packet to the predestined port if the port is listed in the table as active, and sending the received packet to the alternative destination if the port is listed in the table as failed, are implemented in hardware logic. In another embodiment a method is provided wherein, during the step of sending the received packet to the predestined port if the port is listed in the table as active, and sending the received packet to the alternative destination if the port is listed in the table as failed, a fabric interface circuit on an alternate line card is the alternative destination. In another embodiment a method for redirecting packets is provided wherein pre-destinations and alternative destinations are noted by destination tags associated with packets in process.

In another aspect of the invention a router line card is provided, the card enabled for Automatic Protection Switching and comprising multiple external port circuits connecting to external transmission links, a CPU, one or more fabric interface circuits connecting to router fabric cards, and interconnect circuitry on the line card interconnecting the port circuits, the CPU and the fabric interface circuits. The card is characterized in that the CPU monitors the ports and updates information in the fabric interface circuits for ports active or failed, and the fabric interface circuits check predestination for each packet received from the fabric, and redirect all packets predestined for failed ports. In another embodiment a router line card is provided having a fabric interface circuitry comprising of one or more Global Fabric application-specific integrated circuits (GFRs).

In some other embodiments a router line card comprises of four external ports and two GFRs, or has steps wherein the operations of the interface circuitry are implemented in hardware logic. In other embodiments a router line card has a fabric interface circuit on an alternate line card as an alternative destination for a redirected packet, and has pre-destinations and alternative destinations noted by destination tags associated with packets in process.

In another preferred embodiment a data packet router is provided having line cards internally connected by fabric circuitry, wherein individual ones of the line cards comprise multiple external port circuits connecting to external transmission links, a CPU, one or more fabric interface circuits connecting to router fabric cards, and circuitry interconnecting the port circuits, the CPU and the fabric interface circuits. In a preferred embodiment the method is characterized in that the CPU on individual ones of the line cards monitor the ports and update information in the fabric interface circuits for ports active or failed, and the fabric interface circuits check predestination for each packet received from the fabric, and redirect all packets predestined for failed ports. In another embodiment a data packet router can have fabric interface circuitry comprising one or more Global Fabric application-specific integrated circuits (GFRs). In some other embodiments a data packet router comprises four external ports and two GFRs, and logic in the GFRs may be implemented in hardware. In other embodiments a data packet router has a fabric interface circuit on an alternate line card as an alternative destination for a redirected packet, and has pre-destinations and alternative destinations noted by destination tags associated with packets in process.

In all the preferred embodiments of the invention improved method and apparatus is provided allowing new and faster data packet processing hardware to make very quick switchover to alternate routing paths, providing an improved solution to lost data caused by slower switching during a component failure.

BRIEF DESCRIPTION OF THE DRAWING FIGURES

FIG. 6 is a table showing ports and associated line items for the first line card of FIG. 5.

DESCRIPTION OF THE PREFERRED EMBODIMENTS

Figure 1:
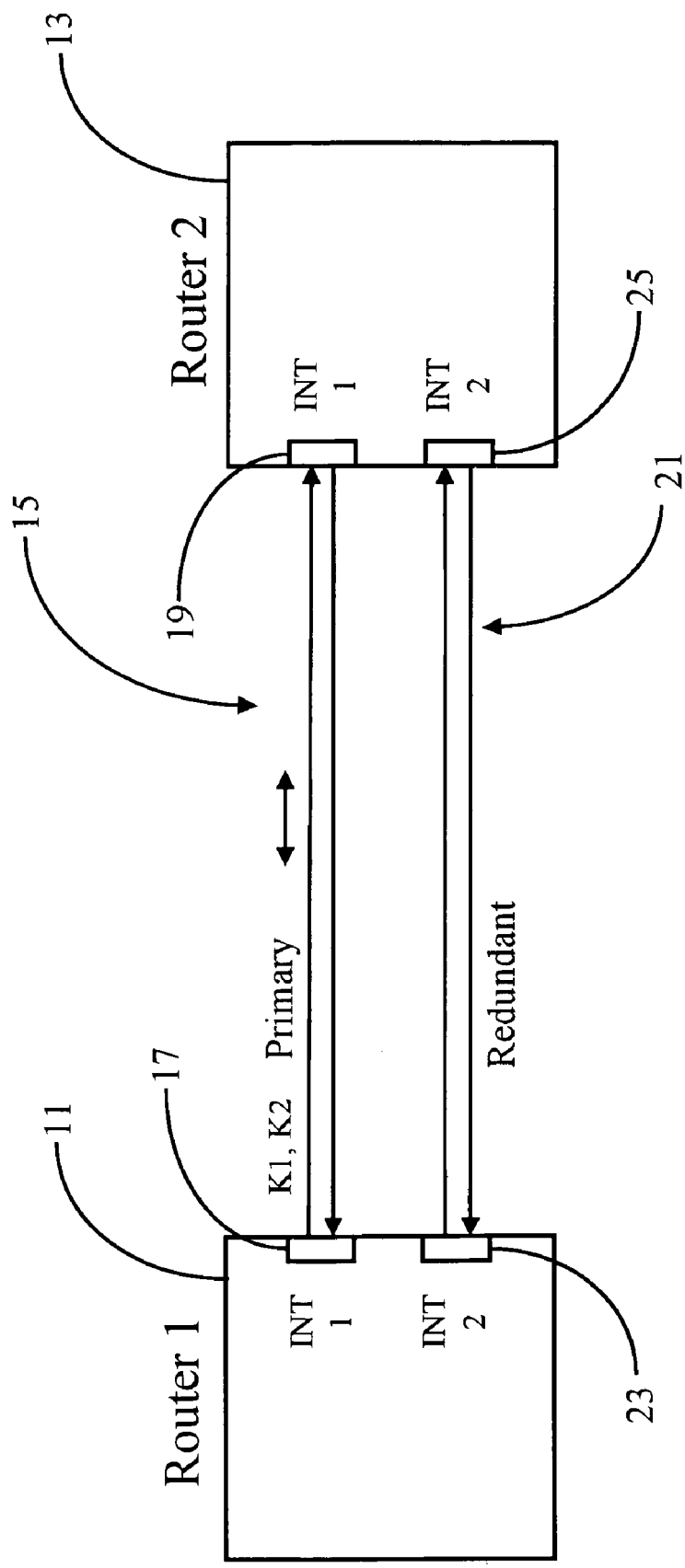
FIG. 1 is a block diagram of a prior art situation, illustrating redundant switching between two routers in the Internet network.

FIG. 1 is a block diagram of a prior art situation, illustrating redundant switching between two routers in the Internet network. FIG. 1 is intended to describe the very general problems that might occur in the Internet between two routers 11 and 13, wherein there is a primary link 15, labeled primary, between an interface 1 (17) on router 1 and an interface 1 (19) on router 2. This primary connection transfers data in both directions, as is indicated by the two-way arrows. In the event there is an equipment failure, software failure, routing path failure, or some other sort of failure, that effects the ability of the primary link to transfer data, there needs to be some form of redundancy. Such a failure can be complete, such as a break in an optic cable, or partial, such as a failure of one or more ports on a line card serving a link.

When a failure or partial failure occurs, such as described immediately above, there needs to be a method and protocol for switching the traffic from the primary link to a secondary, or redundant link, such as link 21 shown in FIG. 1, between two different interfaces labeled INT 2 on each of routers 11 and 13, and labeled also as elements 23 and 25. This switchover needs to happen very quickly, because all packets in process at either router for transfer by the primary link (15) will typically be lost (dropped) until the switchover takes place.

There is in the current art a fiber optic standard known as the SONET standard, which defines considerable standard and protocol for error correction, failure switching, and so forth, for taking care of just these kinds of failures, and for quickly compensating for such failures. These protocols operate on what are known as SONET boxes in the art, which are routing boxes built to, and operating by SONET standards. These boxes do not encompass all Internet routers.

Figure 2:
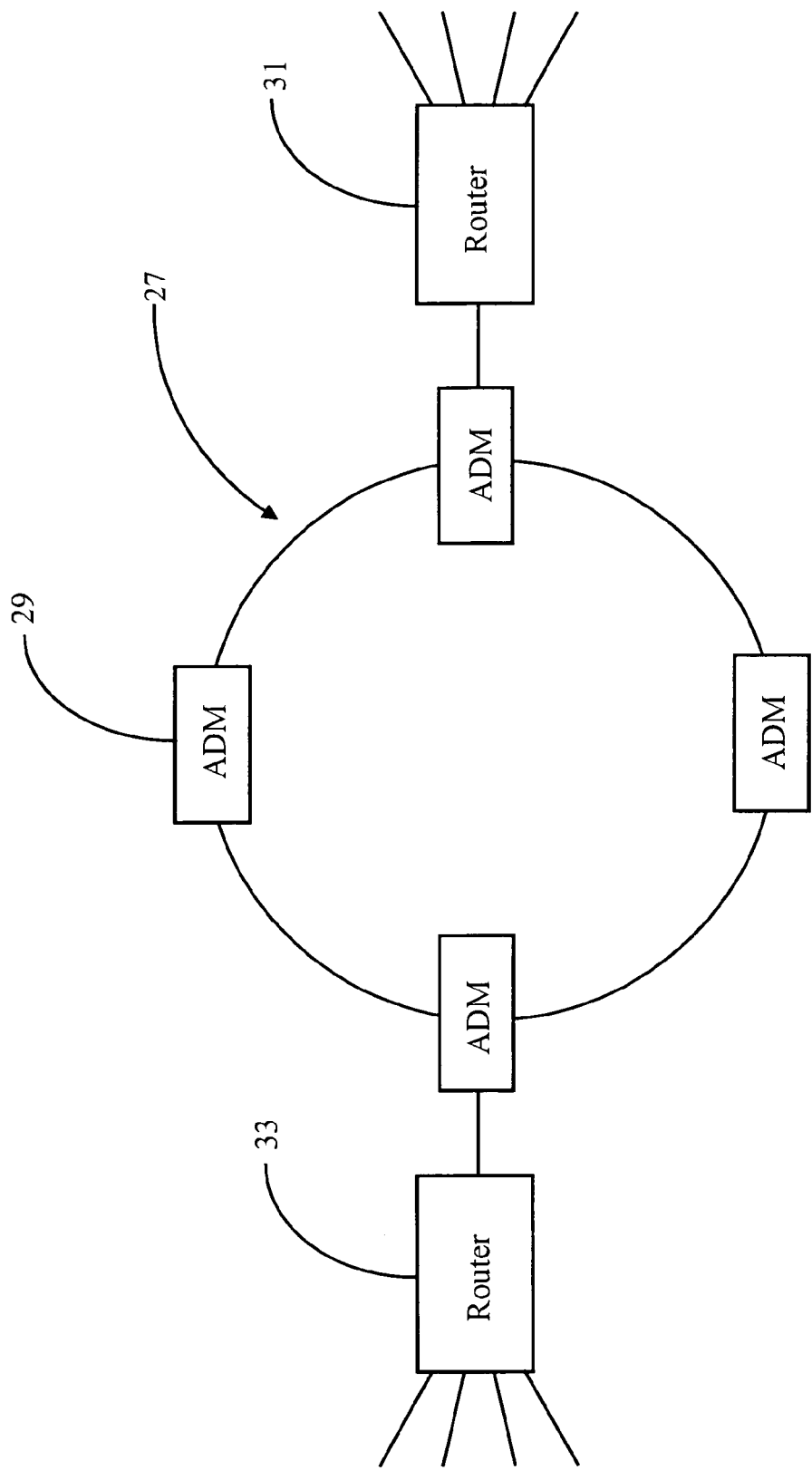
FIG. 2 is a block diagram also labeled prior art showing two edge routers in the Internet connected to a ring of ADM machines.

FIG. 2 is a prior art diagram showing a ring 27 of Add-Drop Multiplexers (ADM) with two routers 31 and 33 connected to the ring. This diagram illustrates the general and typical connection schematic for router interconnection in the Internet, wherein edge routers are connected to individual users, for example, and ADM boxes are used for more core transmission applications. The ADM boxes are SONET devices.

Figure 3:
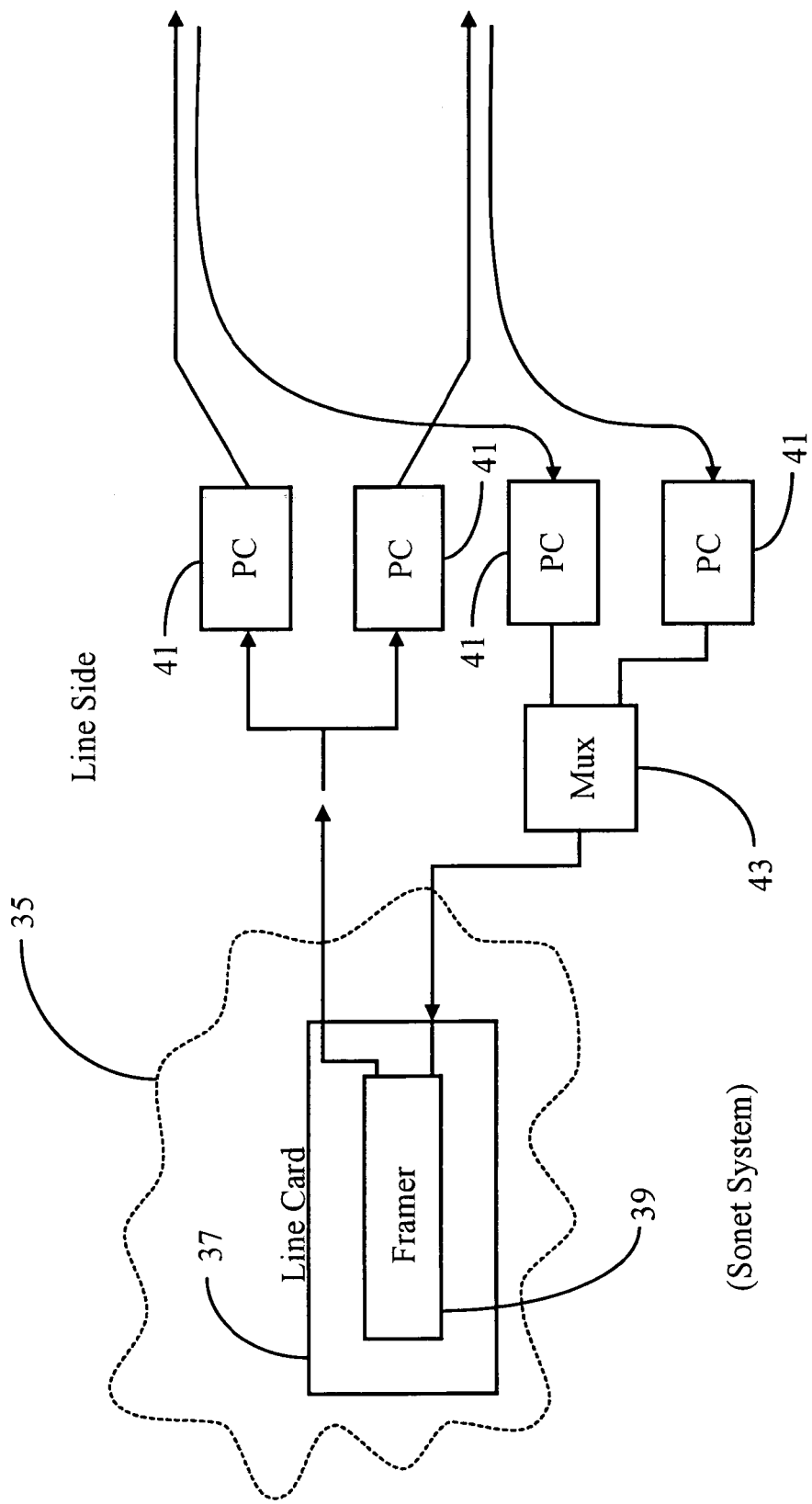
FIG. 3 is a block diagram also labeled prior art illustrating additional detail of ADM architecture.

FIG. 3 is a block diagram illustrating additional detail of architecture of a SONET box 35, such as an ADM, in particular on what is known as the line side; that is the side interfacing to transmission lines or links. A Framer 39 on a line card 37 interfaces through both input and output paths to a number of port cards (PC) 41. Data out from the framer through port cards goes to remote destinations, and data coming in from remote destinations through other port cards is transferred via a multiplexer 43 to framer 39. APS is implemented in the art by switching data from primary port cards to redundant port cards.

Figure 4:
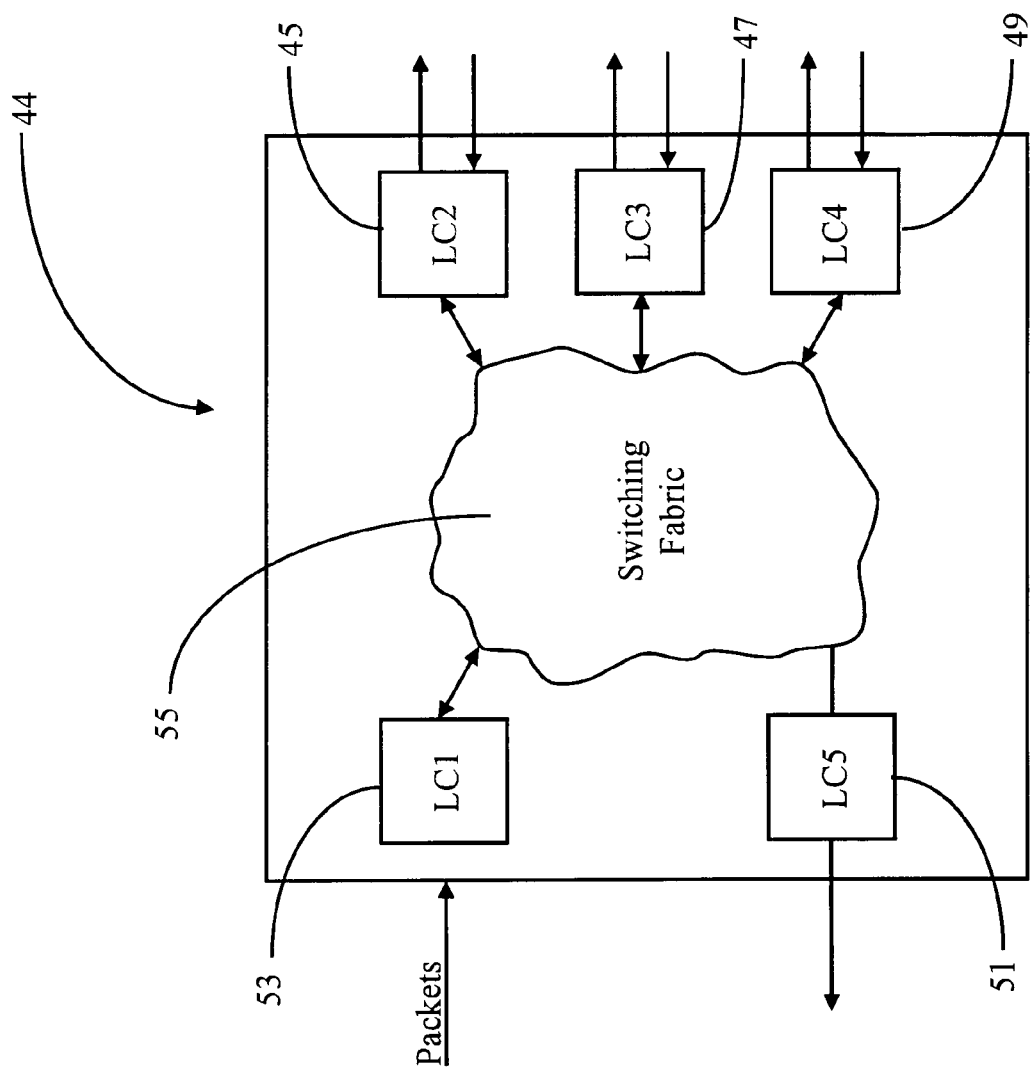
FIG. 4 is a block diagram illustrating a router configuration according to an embodiment of the present invention.

FIG. 4, also labeled prior art, is a block diagram illustrating a router 44, such as a terabit scalable router that may be used as an edge router, such as routers 31 and 33 in FIG. 2. There are 5 line cards 45, 47, 49, 51 and 53 shown for router 44 in FIG. 4, interconnected in the router by switching fabric 55. Each of line cards 45–53 typically has on-card ports, which may be, for example, OC-48c ports known as Packet Processing ASICs (PPAs). The fact that there are no port cards in these routers that are not SONET boxes is an important reason why it is difficult to provide truly rapid protection switching.

Figure 5:
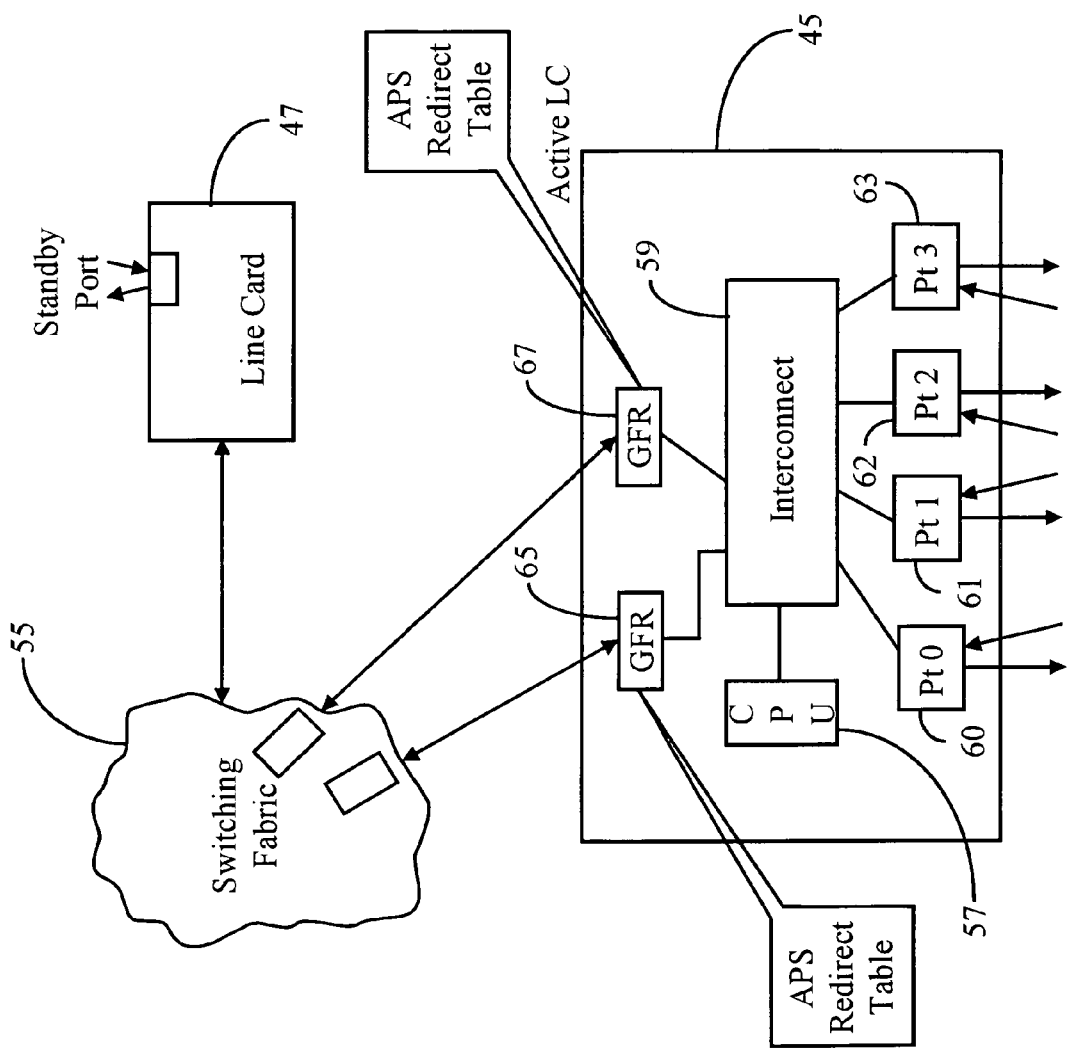
FIG. 5 is a block diagram illustrating more detail of a router configuration and second line card according to an embodiment of the present invention.

In a preferred embodiment of the present invention the inventors have provided automatic protection switching at the level of ports (PPAs) on line cards within an individual router. FIG. 5 is a block diagram illustrating more detail of a single line card of router 44 of FIG. 4, and a second line card 47. In this example, any two of the line cards of the router of FIG. 4 will serve. The switching fabric is element 55. Line card 45 has a CPU 57, interconnect structure 59, and four active ports 60–63 labeled Pt 0 through Pt 3. Each port represents a PPA. The standby port could be on the same line card as the active ports or ports it protects.

The fabric interface for the active line card is an application-specific integrated circuit (ASIC) termed a Global Fabric ASIC and referred to by the inventors by the acronym GFR. In a particular embodiment there are four PPAs on the line card, as shown, each capable of data transfer at 2.5 Gb/s, so the line card is capable of overall data transfer of 10 Gb/s. Each line card in this example has two GFR ASICs, labeled in FIG. 5 as GFRs 65 and 67, for redundancy and performance.

In operation, each GFR on an active line card connects to a fabric card in the fabric structure 55. Data packets being sent into the fabric from a line card are tagged in operations of elements on the line card, in this case typically with a four digit decimal number (which may, of course be rendered in HEX or binary for computing purposes), designating the router destination, and data packets received from the fabric at a GFR come with tags for the GFR receiving them.

In a preferred embodiment of the present invention CPU 57 on active line card 45, following a code sequence, monitors the PPAs, such as PPAs 60–63 on the line card for performance to a standard. This monitoring may be on a continuous or a semi-continuous basis (periodic). Also in this embodiment each GFR stores a port-status table, shown in simplified form in FIG. 6, with a line item for at least each port on the active card. In embodiments of the invention such a table may be stored elsewhere than on a GFR, such as on a PPA, on a fabric card, or elsewhere, as long as access may be made to the port-status table.

Three columns are shown in the table of FIG. 6, a first column indicating each port on the card, a second column with an entry for whether the port is active (meets performance standard) or faulty, and a third column with a redirect tag number. The status column may be a single bit, for example, with a 1 indicating active and a 0 indicating fault (or vice versa), and the redirect tag is a destination tag for a standby port for each port. In some cases the redirect will be the same for all line entries, and in other cases the redirect may be different for each line entry.

On a packet-by-packet basis, as each packet comes into the active line card from the fabric, the receiving GFR checks the table for fault status. If the port is active, the packet goes on to the port. If the status is fault, the GFR replaces the existing tag with the redirect tag, and the packet is bounced back into the fabric and on to the line card 47 which in this case has the standby port.

In operation before the advent of this invention, status could be monitored, and forwarding tables updated on a regular basis, but the process was much too slow to avoid loss of significant quantities of packets. With the redirect tables in the GFRs and PPAs and redirecting packets immediately as the CPU notices faults, packets that would otherwise be lost are redirected and therefore saved. If it is desired to replace the line card with the failed port, the forwarding tables may be updated to direct all traffic away from that line card. Then the line card may be conveniently replaced.

In an alternative embodiment of the present invention the techniques described above related to GFRs on line cards can also be applied within an interconnection network, or fabric, connecting multiple line cards or interfaces. For example, by updating a port redirect table in each fabric element which connects to a line card, those fabric elements can redirect all traffic destined for ports on that line card.

It will be apparent to the skilled artisan that there are many alterations that might be made in embodiments of the inventions described herein within the spirit and scope of the invention. For example, there are different ways the necessary code may be generated, and different ways the invention may be managed in different line cards in different routers. There are many other possible alterations, and the invention should accordingly be granted the scope of the claims that follow.

What is claimed is:

1. In a data packet router, a method for redirecting packets destined for a port, comprising the steps of:
   (a) monitoring only port status on a continuing or periodic basis, for active or failed status;
   (b) updating a port-status table, listing port status as active or failed and an alternative destination for each port;
   (c) checking the table by circuitry along a packet route for a packet en route; and
   (d) sending the received packet to the predestined port if the port is listed in the table as active, and sending the received packet to the alternative destination if the port is listed in the table as failed.

2. The method of claim 1 wherein the port-status table is stored in a fabric interface circuitry and checking and redirecting is implemented in the fabric circuitry.

3. The method of claim 1 wherein the port-status table is stored in one of a Global Fabric ASIC on a line card or a Packet Processing ASIC (PPA) on a line card, and redirection is enabled by a CPU on the line card.

4. The method of claim 1 wherein the operations of the interface circuitry in steps (c) and (d) are implemented in hardware logic.

5. The method of claim 1 wherein, in step (d) the alternative destination is a PPA on an alternate line card.

6. The method of claim 1 wherein pre-destinations and alternative destinations are noted by destination tags associated with packets in process.

7. A router card enabled for Automatic Protection Switching (APS), and comprising:
   one or more circuits enabled for forwarding data packets; and
   a port-status table;
   characterized in that the port-status table lists only individual port's status as active or filled, and also alternative destinations for the ports, and in that packets predestined for failed ports are redirected to alternative ports.

8. The card of claim 7 wherein the card is a line card comprising one or more Global Fabric application-specific integrated circuits (GFRs) as interface circuits to interconnecting fabric.

9. The card of claim 7 wherein the card is a fabric card interconnecting line cards.

10. The card of claim 7 wherein the operations of the one or more circuits for forwarding are implemented in hardware logic.

11. The card of claim 7 wherein the alternative destination for a redirected packet is a port on a line card.

12. The card of claim 7 wherein pre-destinations and alternative destinations are noted by destination tags associated with packets in process.

13. A data packet router having externally-facing line cards internally connected by fabric cards, wherein individual ones of the cards comprise:
   one or more circuits enabled for forwarding data packets; and
   a port-status table;
   characterized in that the port-status table lists only individual port's status as active or failed, and also alternative destinations for the ports, and in that packets predestined for failed ports are redirected to alternative ports.

14. The router of claim 13 wherein the line card comprises one or more Global Fabric application-specific integrated circuits (GFRs) as interface circuits to interconnecting fabric.

15. The router of claim 13 wherein the operations of the one or more circuits for forwarding are implemented in hardware logic.

16. The router of claim 13 wherein the alternative destination for a redirected packet is a port on a line card.

17. The router of claim 13 wherein pre-destinations and alternative destinations are noted by destination tags associated with packets in process.

18. The method of claim 1 wherein the port status table is a distributed table with portions stored in separate places.

19. The method of claim 1 wherein the alternative destination is on the same line card receiving and redirecting the packets.

20. The method of claim 5 wherein the alternative destination is on the same line card.

* * * * *